July 31, 1956 G. A. ROGERS, SR 2,756,963
LIFT TRUCK AND TRAILER THEREFOR
Filed Oct. 23, 1952 2 Sheets-Sheet 1
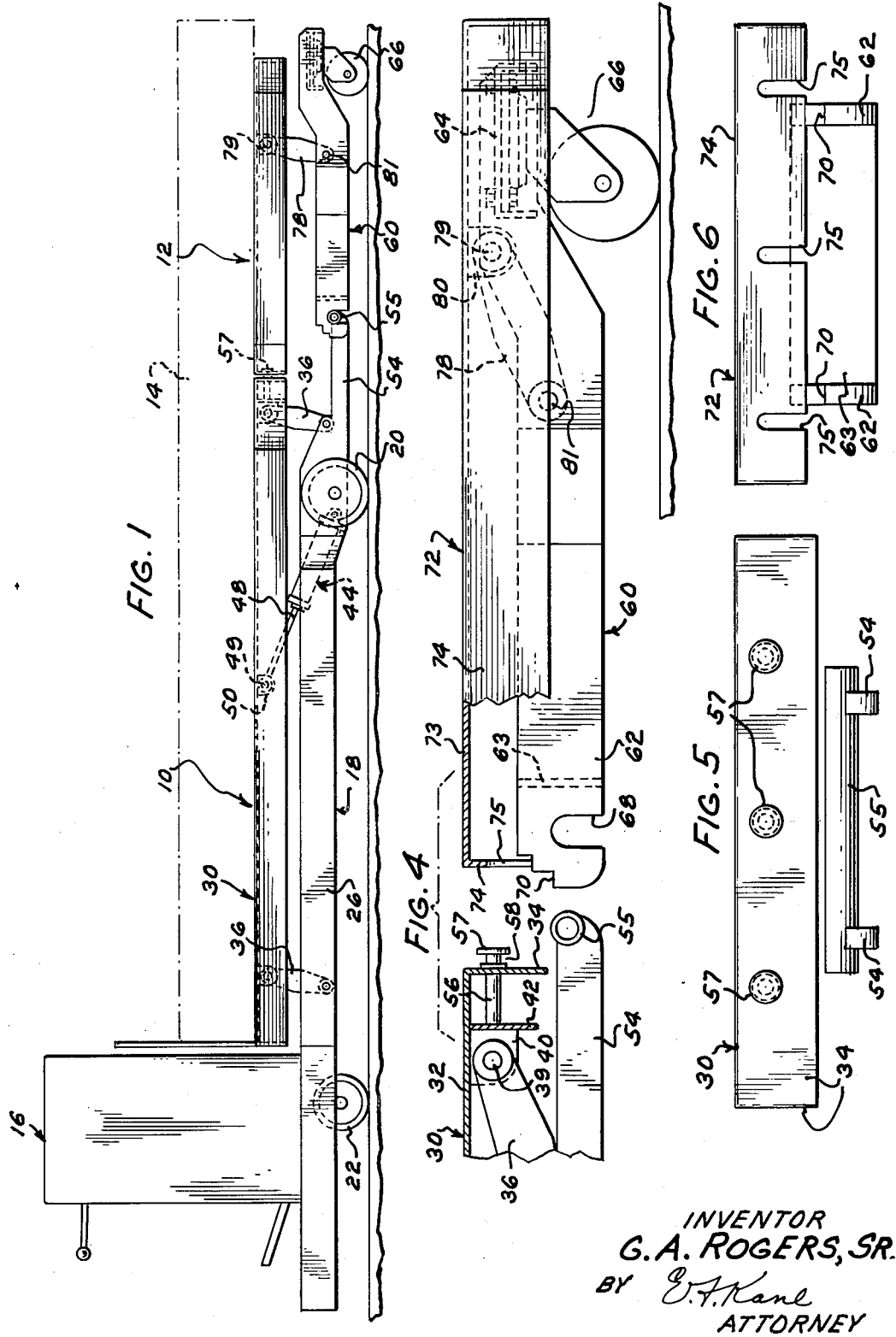
INVENTOR
G. A. ROGERS, SR.
BY E. F. Kane
ATTORNEY July 31, 1956  G. A. ROGERS, SR  2,756,963
LIFT TRUCK AND TRAILER THEREFOR
Filed Oct. 23, 1952  2 Sheets-Sheet 2
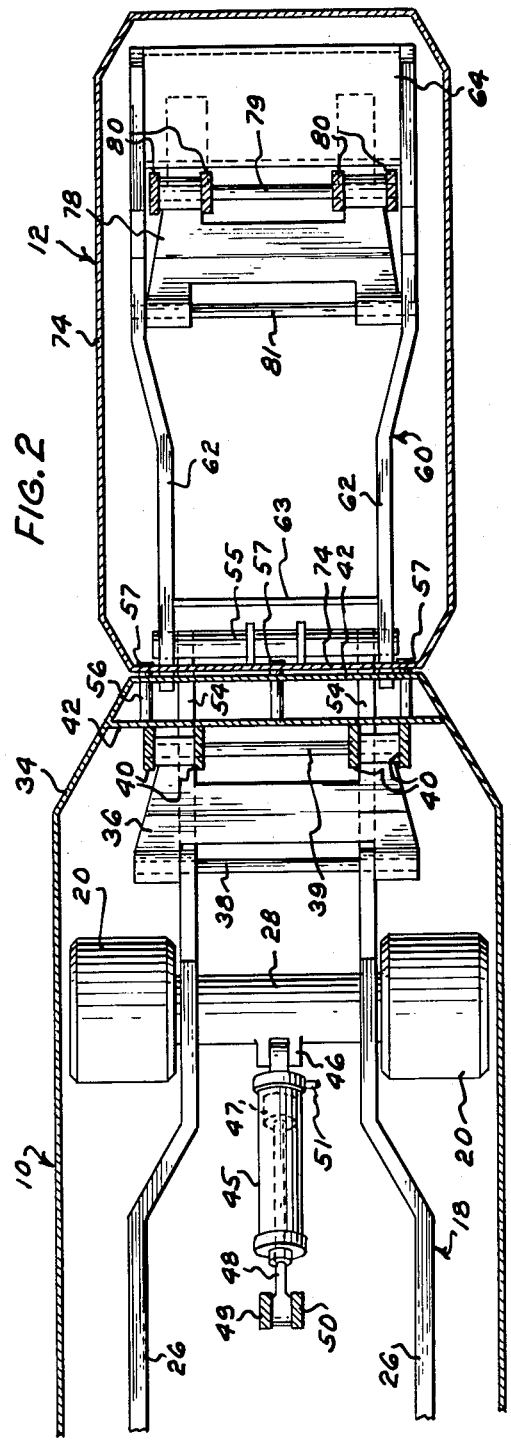
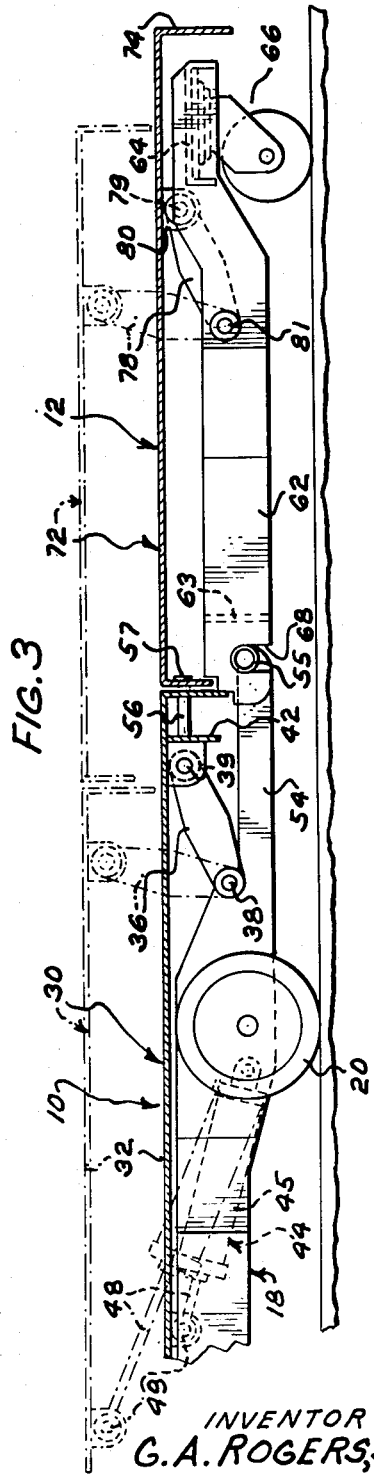
INVENTOR
G. A. ROGERS, SR.
BY
ATTORNEY

United States Patent Office 2,756,963
Patented July 31, 1956

2,756,963

LIFT TRUCK AND TRAILER THEREFOR

George A. Rogers, Sr., Lincoln, Nebr., assignor to Western Electric Company, Incorporated, New York, N. Y., a corporation of New York Application October 23, 1952, Serial No. 316,475

5 Claims. (Cl. 254—10)

This invention relates to lifting trucks and more particularly to sectional lifting trucks having a trailer section detachably connectible to the main truck and having an auxiliary platform thereon movable with the platform of the main truck and forming an extension thereof.

An object of the present invention is to provide sectional lifting trucks having a trailer portion detachably connectible to the main lifting truck and having a movable platform connectible to the platform of the main truck for movement therewith.

A further object of the invention is to provide a trailer section for a lift truck capable of being attached to the end of the truck to form an extension thereof and having a movable platform movable with the platform of the truck.

In accordance with one embodiment of the invention as applied to a lift truck to form an extension therefor, a trailer is provided having a frame supported at one end by a pair of caster rollers and connectible at its other end to the end of the frame of the truck. A movable trailer platform at one end thereof is connectible to one end of the movable platform of the truck and at the other end the trailer platform is connected to one end of a link, which, at its other end, is pivotally connected to the trailer frame and disposed in parallel relation to the links interconnecting the platform and the frame of the truck for supporting the trailer platform for raising and lowering movement with the truck platform.

Other objects and advantages of the invention will become apparent by reference to the following detailed description thereof and the accompanying drawings illustrating a preferred embodiment of the invention, in which Fig. 1 is a side elevational view of a lift truck with the trailer attached thereto and showing the movable platforms in raised position;

Fig. 2 is a plan sectional view of the trailer and a portion of the main truck;

Fig. 3 is a vertical longitudinal elevational sectional view of the portions of the truck and trailer shown in Fig. 2;

Fig. 4 is a side elevational sectional view of the trailer and a portion of the truck in spaced relation to each other;

Fig. 5 is an end view of a portion of the main truck; and

Fig. 6 is an end view of a portion of the trailer.

Referring to Fig. 1 of the drawings, there is shown a conventional lift truck 10 to the end of which is attached the trailer 12 to form an extension of the truck for supporting a load 14 which has a length substantially greater than the length of the truck. As shown somewhat diagrammatically in Fig. 1, the lift truck 10 may be of any of the commercial and well-known types and is indicated herein as being of the self-propelled electrically driven type having a driving unit 16 and the usual controls therefor mounted at one end of the truck. The lift truck 10 has a framework 18 supported on a pair of rear wheels 20 and a pair of forward wheels 22, the latter being turnable in response to the actuation of control members by the operator for guiding the truck. The frame 18 comprises a pair of longitudinal frame members 26 connected together by a plurality of transverse frame members including a housing 28 in which the axle for supporting the rear wheels 20 is mounted.

A movable platform 30 comprising a flat top plate 32 and a peripheral skirt or flange 34 extending downwardly therefrom is mounted on the truck 10 for raising and lowering movement and is interconnected with the frame member 18 by a pair of links 36. The links 36, which are relatively wide to prevent tilting of the platform, are pivotally connected at their lower ends to the frame members by rods 38 and are pivotally connected at their upper ends to rods 39 secured in brackets 40 which are secured to the under side of the top plate 32 of the platform and to a cross plate 42 extending downwardly from the top plate and laterally thereacross between the downwardly extending flanges 34.

The platform 30 is adapted to be raised by mechanism including a fluid actuator 44 comprising a cylinder 45 having one end pivotally connected at 46 to the cross member or housing 28 of the frame 18 and having a piston 47 therein, the rod 48 of which is pivotally connected at 49 to a bracket 50 on the platform 30. In response to the flow of hydraulic fluid through a line 51 into the lower end of the cylinder 45, the actuator 44 imparts movement to the platform 30 in the upward and lateral direction to cause the platform to swing upwardly and forwardly under guidance of the links 36 to the raised position as shown in Fig. 1.

The frame members 26 having portions 54 thereof extending rearwardly beyond the end of the platform 30 and to the outer ends of the portions 54 is welded a tubular draw bar 55, the ends of which project laterally beyond the frame members 54. A plurality of rods 56 are welded to the cross plate 42 and the end flange 34 of the platform 30 and have heads 57 forming connecting elements projecting rearwardly from the platform and provided with annular grooves 58 therein (Fig. 4).

The trailer 12 has a frame 60 comprising longitudinally extending frame members 62 connected at the forward end by a cross plate or frame member 63 and at the rear end by an inverted U-shaped frame member 64. A pair of casters 66 secured to the rear cross frame 64 of the trailer supports the rear portion thereof and the forward ends of the frame members 62 are provided with upwardly extending notches 68 for receiving the draw bar 55 of the truck therein whereby the forward ends of the frames 60 may be connected to the rear end of the frame 18 of the truck. The forward portions of the frame members 62, when connected to the frame 18 of the truck, are disposed on the outer sides of the extensions 54 thereof to prevent lateral displacement of the trailer, and the forward end of the frame members 62 are notched to provide shoulders 70 which are positioned under the rear flange 34 of the platform 30 of the truck when the platform is in its lower position (Fig. 3). To attach the trailer frame to the truck frame it is necessary to first move the platform 30 to its raised position and after the trailer frame 60 has been assembled or connected to the draw bar 55 of the truck frame and the platform 30 is in its lower position the trailer frame 60 is locked in position thereby against vertical displacement.

The trailer is provided with a platform 72 comprising a flat top plate 73 and peripheral downwardly extending flanges or walls 74. At the forward end thereof the platform is provided with a plurality of vertically extending slots 75 adapted to receive the connector elements 57 therein and engage in the annular grooves thereof for effecting a connection between the platforms 30 and 72.

The rear portion of the trailer platform 72 is connected to the frame 60 through a link 78 for guiding the platform upwardly and forwardly through an arcuate movement similar to that traversed by the platform 30. The link 78 at its upper end is pivotally mounted on a rod 79 which is supported in brackets 80 on the platform 72 and at its lower end the link 78 is pivotally supported on a rod 81 mounted in the frame member 62.

When it is desired to attach the trailer 12 to the truck 10 to provide an extension therefor and to form a sectional truck having a lifting platform of increased length to accommodate exceptionally long loads, the truck 10 and the platform are disposed in end-to-end relation and the platform 30 is moved to its raised position. The frame 60 of the trailer may then be attached to the draw bar 55 of the truck by raising the forward end of the frame and placing it in the position shown in Figs. 2 and 3 with the draw bar 55 engaging in the notches 68 and supporting the forward end of the frame 60. The platform 72 of the trailer is then tilted about the rod 79 to move the forward end thereof out of the path of movement of the rear end of the platform 30, after which the platform 30 is moved to its lower position. The tilted trailer platform 72 may then be lowered to cause the slots 75 in the front wall 74 thereof to interfit with connector elements 57 on the truck platform 30 and establish a connection between the platforms 30 and 72. The connector elements 57 on the truck support the forward end of the trailer platform and the flanged portions of the conductor elements 57 engage portions of the walls 74 to impart longitudinal movement to the platform 72 in response to movement of the trailer 30. When there is no further need for a sectional truck of increased length the trailer 12 may be readily detached from the truck by first tilting the trailer platform to disconnect the forward end from the connector 57, then raising the platform 30 and disconnecting the frame 60 from the draw bar 55.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A sectional lift truck comprising a main frame, roller means for supporting said frame for rolling movement, a main platform supported on said frame, linkage interconnecting the main frame and the main platform to guide the platform to and from a lower position and a raised position, means interconnecting said platform and said frame for moving said platform relative to said frame to and from said lower and said raised positions, an auxiliary framework having means on one end thereof engageable with one end of said main frame for releasably connecting said one end of the auxiliary frame to said main frame, means including rotatable members at the other end of said auxiliary frame for supporting said other end of the auxiliary frame for rolling movement, an auxiliary platform supported on said auxilary frame, means for releasably connecting one end of the auxiliary platform to one end of the main platform for movement therewith, and link means interconnecting the other end of said auxiliary frame and the other end of said auxiliary platform for guiding the platform for movement to and from lower and raised positions.

2. A sectional lift truck comprising a main frame having a transversely disposed draw bar at the rear end thereof, roller means for supporting said frame for rolling movement, a main platform, link means interconnecting the main frame and the main platform to guide the platform to and from a lower position and a raised position, means for moving said platform relative to said frame to and from said lower and said raised positions, an auxiliary framework having a pair of spaced longitudinal frame members with notches extending upwardly from the bottom at one end thereof for receiving said draw bar therein to connect said one end of the auxiliary frame to said main frame for longitudinal movement, a pair of casters on the other end of said auxiliary frame for supporting said other end of the auxiliary frame for rolling movement, an auxiliary platform supported on said auxiliary frame, link means interconnecting the other end of said auxiliary frame and one end portion of the auxiliary platform for guiding said one end of the platform for movement relative to said auxiliary frame to and from lower and raised positions and for supporting said auxiliary platform for pivotal movement about the end of said link means, and means on one end of said main platform and on the other end of said auxiliary platform for releasably connecting said other end of the auxiliary platform to said one end of the main platform.

3. A sectional lift truck comprising a main frame having a pair of longitudinal frame members and a transversely disposed draw bar at the rear end thereof, roller means for supporting said frame for rolling movement, a main platform supported on said frame, link means interconnecting the main frame and the main platform to guide the platform to and from a lower position and a raised position, means for moving said platform relative to said frame to and from said lower and said raised positions, an auxiliary framework having a pair of longitudinal frame members with notches extending upwardly from the bottom at one end thereof for receiving said draw bar therein to releasably connect said one end of the auxiliary frame to said main frame for longitudinal movement; the longitudinal frame members of one of said frames being disposed on the outside of the longitudinal frame members of the other frame and in close proximity thereto when said frames are connected together to prevent lateral displacement of one relative to the other, a pair of rollers swively mounted on the other end of the auxiliary frame for supporting said other end of the auxiliary frame for rolling movement, an auxiliary platform supported on said auxiliary frame, link means interconnecting the other end of said auxiliary frame and one end portion of the auxiliary platform for guiding said one end of the platform for movement relative to said auxiliary frame to and from lower and raised positions and for supporting said auxiliary platform for pivotal movement about the end of said link means, and means for releasably connecting said other end of the auxiliary platform to said one end of the main platform.

4. A sectional lift truck comprising a main frame having a pair of longitudinal frame members and a transversely disposed draw bar at the rear end thereof, means including wheels mounted at the forward and rear portions of said main frame for supporting said frame for rolling movement, a main platform supported on said frame, a plurality of headed connector elements on one end of said platform, link means interconnecting the main frame and the main platform to guide the platform to and from a lower position and a raised position, means for moving said platform relative to said frame to and from said lower and said raised positions, an auxiliary framework having a pair of spaced frame members with notches extending upwardly from the bottom on one end thereof for receiving said draw bar therein to releasably connect said one end of the auxiliary frame to said main frame for longitudinal movement, the longitudinal frame members of one of said frames being disposed on the outside of the longitudinal frame members of the other frame and in close proximity thereto when said frames are connected together to prevent lateral displacement of one relative to the other, roller means on the other end of said auxiliary frame for supporting said other end of the auxiliary frame for rolling movement, an auxiliary platform supported on said auxiliary frame, link means interconnecting the other end of said auxiliary frame and one end portion of the auxiliary platform for guiding said one end of the platform for movement relative to said auxiliary frame to and from a lower position and a raised position and for supporting said auxiliary platform for pivotal movement about the end of said link means, and a member on the other end of said auxiliary platform provided with a plurality of downwardly directed slots for receiving therein the headed connector elements on said one end of the main platform for releasably connecting said other end of the auxiliary platform to said one end of the main platform for movement therewith.

5. A trailer for a lift truck having a frame mounted on wheels, a movable platform interconnected therewith through a plurality of links, and means for moving said platform to and from lower and raised positions, said trailer comprising a frame having a slotted end portion engageable with a connector element on the end of said truck frame to releasably connect said one end of the trailer frame to said truck frame, a pair of casters mounted on the other end of said trailer frame for supporting said other end of said trailer frame, a movable trailer platform having means on one end thereof engageable with connector elements on said truck platform for releasably connecting said one end of the trailer platform to the truck platform, a link having one end thereof pivotally connected to said other end portion of the trailer frame and the other end thereof pivotally connected to the other end portion of said trailer platform for guiding said trailer platform for movement to and from lower and raised positions in response to movement of said truck platform to and from said lower and raised positions.

References Cited in the file of this patent

UNITED STATES PATENTS

| | | |
|---|---|---|
| 1,325,864 | Ross | Dec. 23, 1919 |
| 1,402,480 | Childress | Jan. 3, 1922 |
| 1,432,267 | Simpson | Oct. 17, 1922 |
| 1,818,060 | Holman | Aug. 11, 1931 |

FOREIGN PATENTS

| | | |
|---|---|---|
| 242,736 | Great Britain | Nov. 19, 1925 |
| 848,318 | France | July 24, 1939 |